(12) United States Patent
Farley

(10) Patent No.: US 9,504,940 B2
(45) Date of Patent: Nov. 29, 2016

(54) OFFSET FILTERED SHOWERHEAD

(71) Applicant: Michelle Farley, Corona, CA (US)

(72) Inventor: David Aaron Farley

(*) Notice: Subject to any disclaimer, the term of this patent is extended or adjusted under 35 U.S.C. 154(b) by 211 days.

(21) Appl. No.: 14/254,693

(22) Filed: Apr. 16, 2014

(65) Prior Publication Data

US 2015/0298143 A1 Oct. 22, 2015

(51) Int. Cl.
| | | |
|---|---|---|
| C02F 1/00 | (2006.01) |
| B01D 35/04 | (2006.01) |
| B05B 15/00 | (2006.01) |
| E03C 1/04 | (2006.01) |
| B01D 35/02 | (2006.01) |
| B05B 1/18 | (2006.01) |
| B05B 1/16 | (2006.01) |

(52) U.S. Cl.
CPC ............ B01D 35/02 (2013.01); B01D 35/043 (2013.01); B05B 1/18 (2013.01); B05B 15/008 (2013.01); C02F 1/003 (2013.01); E03C 1/0409 (2013.01); B05B 1/16 (2013.01); C02F 2201/006 (2013.01); C02F 2307/06 (2013.01); E03C 2201/40 (2013.01)

(58) Field of Classification Search
CPC ....... B05B 1/18; B05B 15/008; B05B 1/185; C02F 1/003; C02F 2201/006; C02F 2307/06; B01D 35/02; B01D 35/04; B01D 35/043; B01D 35/046; B01D 2221/02; E03C 2201/40
USPC ................. 239/553, 462, 575, 590, DIG. 23; 210/449, 282; 4/567, 601, 615–618
See application file for complete search history.

(56) References Cited

U.S. PATENT DOCUMENTS

| 808,910 A * | 1/1906 | Dunham ............ B01D 35/043 137/613 |
| 4,504,389 A * | 3/1985 | Rundzaitis .......... B01D 35/043 210/266 |
| 5,152,464 A | 10/1992 | Farley |

(Continued)

FOREIGN PATENT DOCUMENTS

| CN | 204122269 | 1/2015 |
| EP | 1106259 | 8/2006 |

OTHER PUBLICATIONS

International Search Report from USPTO dated Jul. 9, 2015 for corresponding PCT Application No. PCT/US2015/025985.

(Continued)

*Primary Examiner* — Arthur O Hall
*Assistant Examiner* — Alexander Valvis
(74) *Attorney, Agent, or Firm* — Klein, O'Neill & Singh, LLP

(57) ABSTRACT

A multi-mode showerhead has a housing with a front and a back and an offset integrated water filter system incorporated into the showerhead so that the showerhead with the integrated water filter system may be easily mounted to a normal shower arm without the need of special tools. A water filter cartridge is easily added to or removed from a hollow filter chamber formed in the showerhead by the removal of a front facing filter chamber cap. A multi-mode switch that selectively changes the spray pattern is mounted on the front between the water filter system and a plurality of nozzles. The entire showerhead and integrated offset water filter system is mounted on a shower arm by means of a swivel joint forming an inlet on the back of the housing and fluidly connected to the hollow filter chamber.

10 Claims, 3 Drawing Sheets

(56) References Cited

U.S. PATENT DOCUMENTS

| | | | | |
|---|---|---|---|---|
| 5,213,688 A * | 5/1993 | Robinson | ............ | B01D 29/114 |
| | | | | 210/440 |
| 5,300,224 A | 4/1994 | Farley | | |
| D361,622 S | 8/1995 | Farley | | |
| 5,503,742 A | 4/1996 | Farley | | |
| 5,545,314 A * | 8/1996 | Parise | ............ | C02F 1/003 |
| | | | | 210/100 |
| 5,753,118 A * | 5/1998 | Yang | ............ | B01D 35/04 |
| | | | | 210/266 |
| D406,874 S | 3/1999 | Farley | | |
| 5,914,043 A | 6/1999 | Farley | | |
| 6,016,977 A | 1/2000 | Farley | | |
| 6,056,875 A | 5/2000 | Farley | | |
| 6,187,187 B1 | 2/2001 | Farley | | |
| 6,214,224 B1 | 4/2001 | Farley | | |
| 6,241,880 B1 * | 6/2001 | Yahr | ............ | B01D 35/043 |
| | | | | 137/801 |
| 6,270,023 B1 | 8/2001 | Farley | | |
| 6,325,930 B2 | 12/2001 | Farley | | |
| D462,108 S | 8/2002 | Farley | | |
| D463,844 S | 10/2002 | Farley | | |
| 6,537,455 B2 | 3/2003 | Farley | | |
| 6,599,428 B1 * | 7/2003 | Douglas | ............ | C02F 1/281 |
| | | | | 210/266 |
| D483,438 S | 12/2003 | Farley | | |
| 7,097,122 B1 | 8/2006 | Farley | | |
| 7,866,576 B1 | 1/2011 | Farley | | |
| 8,616,470 B2 | 12/2013 | Williams | | |
| 2003/0006304 A1 | 1/2003 | Cool et al. | | |
| 2004/0056123 A1 * | 3/2004 | Douglas | ............ | B05B 1/1654 |
| | | | | 239/587.4 |
| 2008/0121293 A1 | 5/2008 | Leber et al. | | |
| 2012/0048968 A1 | 3/2012 | Williams | | |
| 2014/0042241 A1 | 2/2014 | Cai et al. | | |

OTHER PUBLICATIONS

Written Opinion from USPTO dated Jul. 9, 2015 for corresponding PCT Application No. PCT/US/2015/025985.

* cited by examiner

OFFSET FILTERED SHOWERHEAD

BACKGROUND OF THE INVENTION

1. Field of the Invention

This invention generally relates to filtered showerheads and, more particularly, to a combination multi-mode showerhead and offset integrated water filter system.

2. Description of the Prior Art

Shower filters for use in conjunction with showerheads and filtered showerheads for use in showers are known. For example, filters are inserted at ends of shower arms, with showerheads then secured to the filters, or filtered shower heads are attached directly to the ends of the shower arms. However, because of the size of the filter and attached showerhead or the filtered showerhead, they may extend too far into the shower area. Furthermore, the known filters or filtered showerheads add weight to the shower arm, which over time may cause problems. Additionally, the known filters and filtered showerheads are not easily adjustable about their swivel joints, or are limited in how they may be adjusted. Such known filters and filtered showerheads also tend to be costly to manufacture and are not used by some persons because of their size or style and difficulty for some people in inserting or removing the shower filter cartridge. For example, the known filters and filtered showerheads do not always match person's aesthetic taste, and/or the overall décor of a bathroom or shower area. Finally, the known filters and filtered showerheads cannot be used with large, modern showerheads, such as the flower shaped or watering can type, and do not have an integrated feel or look when used with known shower arms.

Known shower filter and filtered showerhead assemblies are set forth in U.S. Pat. Nos. 5,152,464, 5,300,224, 5,503,742, 6,016,977, 6,187,187, 6,214,224, 6,270,023, 6,325,930 and 6,537,455 to Farley. Furthermore, a known large, modern showerhead, of the so-called rainfall type having a water selection or mode control is set forth in U.S. Pat. No. 8,616,470.

While the foregoing prior art devices allow for different spray or flow control and provide improved filtration of water passing through them, they do not provide for a showerhead with an offset integrated water filter assembly that may be attached or secured to a shower arm and which provides increased aesthetics and functionality, as well as a mode selection switch. The device of the present invention provides a showerhead with selective mode control by means of a switch and an offset integrated water filter system that overcomes many of the problems with known showerhead and shower filter combinations. Additionally, a water filter cartridge is easily inserted into and removed from the showerhead of the present invention by means of a cap on a front opening water filter housing thereby allowing for an increased showerhead height in the shower area.

Therefore, there exists a need in the art for a less, cumbersome, easy-to-install and move, combination showerhead and water filter system that overcomes known problems and provides a large, modern showerhead with filtered water, selective spray control and a front loading water filter housing.

SUMMARY OF THE INVENTION

The offset filtered showerhead of the present invention provides many advantages including, but not limited to the following:

1) Minimizes showerhead extension by use of an offset shower water filter system placed at the side of the showerhead that allows contouring of the spray nozzles thereby minimizing showerhead extension;as opposed to the increased extension created by an in-line integrated shower water system. This integrated offset filter system increases showerhead height in the shower area.

2) Front loading of a replacement filter cartridge in the showerhead eliminates the requirement for removal of the showerhead from the shower arm and/or disassembly of the showerhead to remove the shower filter cartridge. This novel front loading of a replacement cartridge makes changing of a filter cartridge easier, resulting in the exchanging of a cartridge more often, to thereby maintain maximum filtration.

3) The size and shape of the offset integrated filter system acts as a counter-balance to the showerhead when raised and keeps the entire integrated showerhead in position on the swivel-ball which attaches to the shower arm.

4) In known filtered showerheads water normally flows horizontally through an even bed of granular media and the granules tend to compact unevenly creating spaces or voids due to the combined effects of hydro-dynamics, specific weight of the individual granules and gravity. As the water continues to flow through the filter bed, the voids expand forming channels. Since water travels the path of least resistance, the water flow increases through the channel while expanding the size of the channels resulting in poor filtration performance as even less water contacts the filtration media. However, the Integrated offset filter system of the present invention directs the water vertically from the bottom to the top of the filtration bed. As the water flows upward the granules are loosened and through the effects of gravity, resettle, compacting evenly without forming voids or channels. This results in maximum water/to media contact and therefore optimum filtration performance.

5) The showerhead of the present invention provides a contoured spray pattern and optimum water flow directed to the contoured body as opposed to round spray heads which create round spray pattern. Contoured spray is more efficient and provides less wasted water, saving both water and energy.

6) Repositioning of the multimode control valve to the front or water side of the showerhead, after the offset integrated filter system allows for a contour shape and contouring of the spray nozzles in the showerhead.

Accordingly, it is a general object of the present invention to provide an improved combination showerhead and filter assembly. It is a more particular object of the present invention to provide a combination showerhead and offset water filter system. It is a further object of the present invention to provide a combination showerhead and filter assembly shower arm and water filter combination that minimizes showerhead extension into the shower area. It is yet another object of the present invention to provide an offset filtered showerhead that may be easily used to replace an existing showerhead or showerhead water filter combination. It is a still further object of the present invention to provide a novel offset filtered showerhead that has an integrated design that is more aesthetically pleasing and allows easy access to the filter cartridge.

In accordance with one aspect of the present invention there is provided, a combination multi-mode showerhead having an offset integrated water filter system incorporated into the showerhead that may easily be mounted to a shower arm without the need of special tools.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
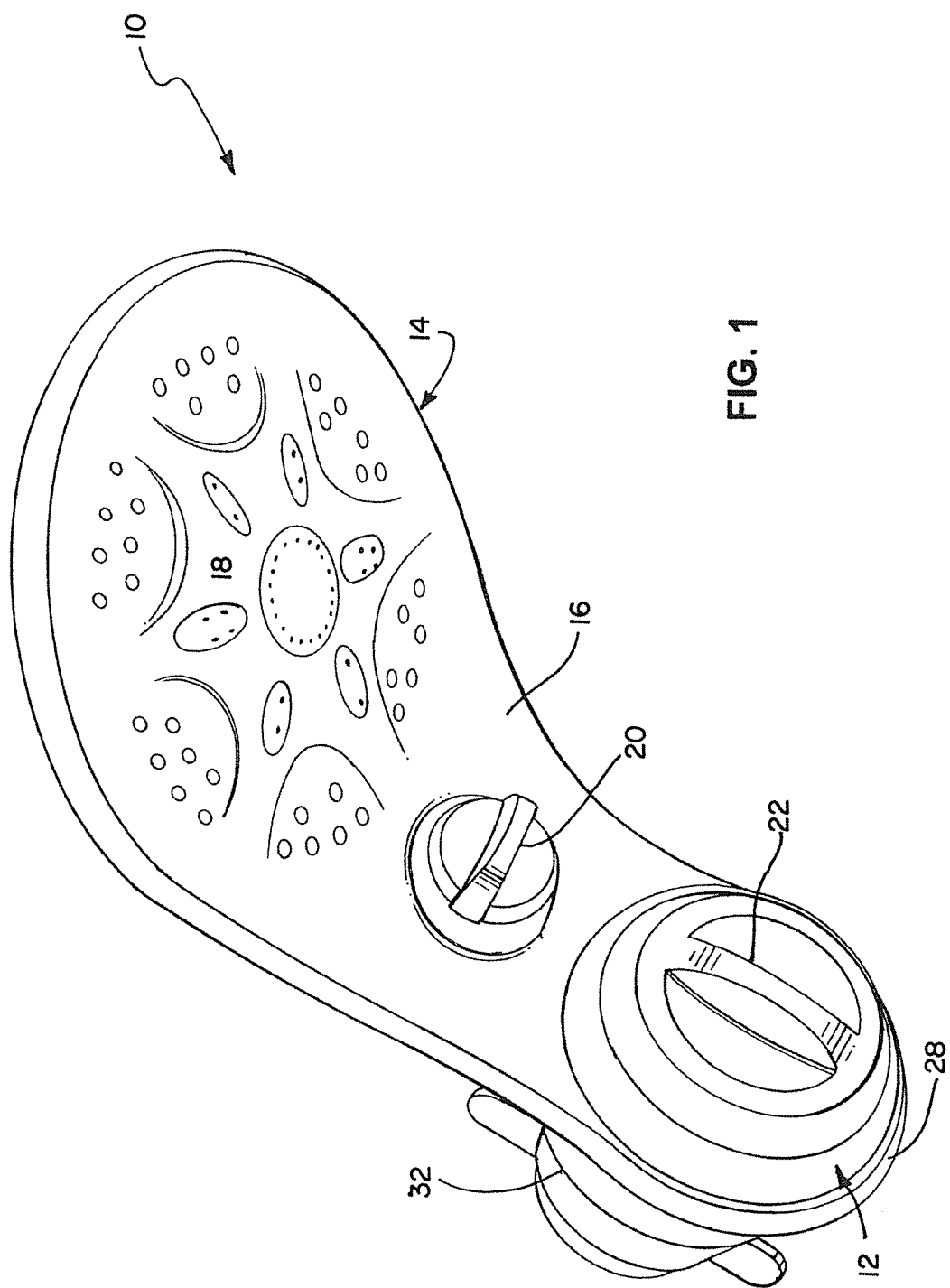
FIG. 1 is a perspective front facial view of a combination multi-mode showerhead having an offset integrated water filter system of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a combination multimode showerhead having an offset integrated water filter assembly.

The combination multimode showerhead having an offset integrated water filter system of the present invention is mounted directly on a regular shower arm coming out of a shower wall, and is normally screwed on to or otherwise secured to the shower arm and extends into the shower area.

Turning now to the drawings, the figures illustrate a multi-mode showerhead 10 having an offset integrated water filter system 12 incorporated in the showerhead. The combination showerhead 10 and water filter system 12 includes a multi-piece body or housing 14 having a front face or portion 16 with a plurality of spray nozzles in an area 18 at a first or head end, a mode selector switch or knob 20 in a center portion and a front cap or closure 22 over the offset water filter system 12 at an enlarged second or rear end.

Figure 2:
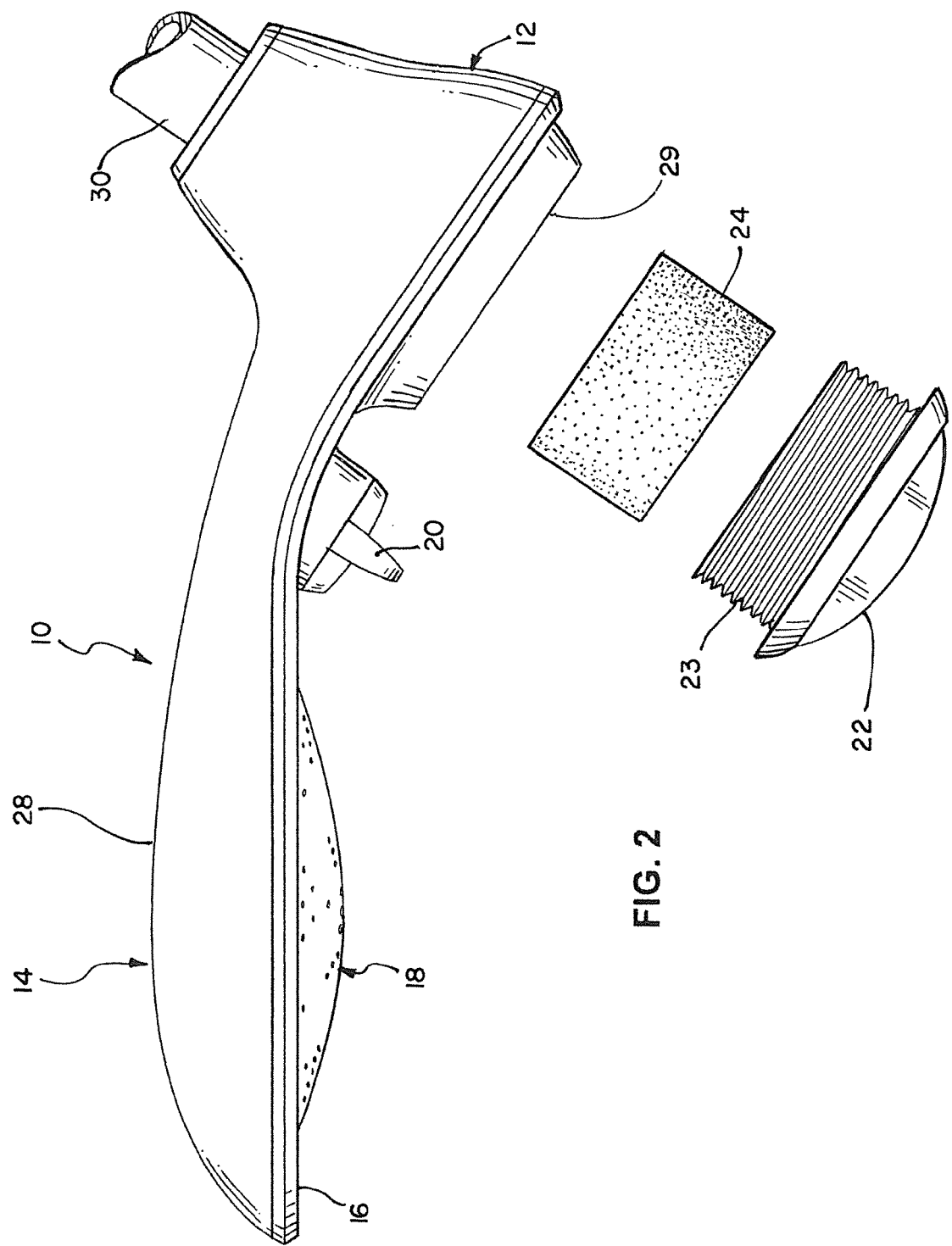
FIG. 2 is a partially exploded side elevational view of FIG. 1.
Figure 3:
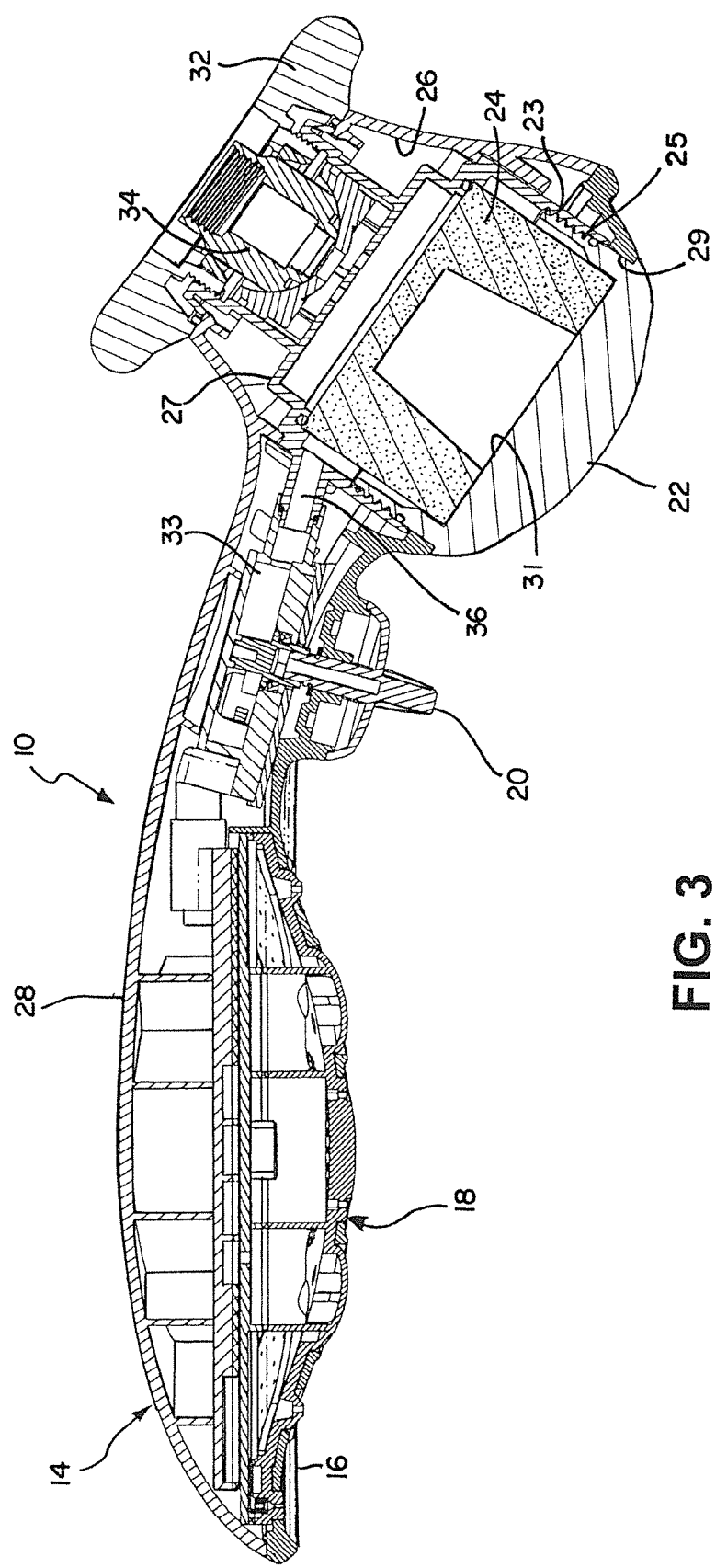
FIG. 3 is a cross-sectional view, taken along line 3-3, of FIG. 1.

As best shown in FIGS. 2 and 3, the cap 22 may be easily removed from an opening 29, as by unscrewing of a threaded portion 23, from internal threads 25 formed internally on an internal holding or sealing member 27, to allow a filter cartridge 24 having filter media arranged as a bed therein, to be easily inserted into or removed from within a hollow internal chamber 26. The multi-piece body or housing 12 is easily screwed onto a normal shower arm 30 coming out of a shower wall, not shown, by means of a connector or connecting element 32 on an enlarged area of a rear or upper portion 28 of the housing 14, at the second end thereof. An internally threaded swivel ball or joint 34 extends into and is sealingly held in the housing by means of the holding element 27 (see FIG. 3) thereby forming a water inlet into the showerhead.

As shown, the body 14 includes at least upper and lower or front and rear portions or sections 16, 28 secured together in any known manner. The filter cartridge 24 may be inserted into and sealing held against the holding element 27 within internal chamber 26, either before or after the showerhead 10 is mounted on the shower arm 30, through an opening 29 in the front face of the front portion of section 16, in which the removable cap 22 is inserted and held.

In use, when the showerhead 10 is properly mounted on a shower arm, in any known manner as, for example, by means of the screw threads formed internally of the swivel ball 34 and the connector 32, water enters through the inlet and flows through the holding element 27 and then through filter cartridge 24 from the bottom of the filter cartridge and the filter media bed held therein abutting the holding element 27, to the top thereof, adjacent the cap 22. The hollow internal chamber 26 and the holding element 27 are sized and dimensioned to snugly hold the filter cartridge therein and abutting an interior surface 31 of the cap 22, when it is secured in place. Water passes through the filter media bed and exits the filter cartridge into the internal chamber 26 and then through one or more connecting passages 36 into selected hollow interior passages of the mode selector switch 20. The mode selector switch is rotated or turned, in a known manner, to direct the filtered water to selected spray nozzles in the nozzle area 18 for exit into the shower area in the selected spray pattern.

The combination multimode showerhead and offset integrated water filter assembly of the present invention may take any number of different configurations, depending on the aesthetic look desired.

It, therefore, can be seen that the present invention provides an improved less cumbersome, easy-to-install and use combination multimode showerhead having an offset integrated water filter assembly providing an integrated design, with a single housing comprised of a number of integrated components that may be easily manipulated, and which may be used with any available shower arm, without the need of special tools or adapters.

Those skilled in the art will appreciate that various adaptations and modifications of the just-described preferred embodiment may be configured without departing from the scope and spirit of the invention. Therefore, it is to be understood that, within the scope of the appended claims, the invention may be practiced other than is specifically described herein.

What is claimed is:

1. A combination multimode showerhead and integrated offset water filter system comprising:
   a multi-piece housing comprising a front portion and a rear portion with a water inlet in the rear portion and a water outlet having a plurality of spray nozzles on a first end of a front face of the front portion;
   the water inlet including a swivel joint fluidly connected to a holding element held in a hollow filter cartridge holding chamber integrated with the rear portion;
   a cap removably mounted in an opening at a second end in the front face of the front portion over the integrated hollow water filter cartridge chamber;
   a removable water filter cartridge held against the holding element in the water filter cartridge chamber;
   the water filter cartridge being removable from the holding element and the water filter cartridge chamber through the opening in the front face of the front portion when the cap is removed;
   a multimode selector switch movably held on the front face of the front portion in a central portion between and fluidly connected to the hollow water filter cartridge chamber and the plurality of spray nozzles to direct a flow of water from the water filter cartridge chamber passing through the multimode selector switch to selected spray nozzles of said plurality of spray nozzles in the water outlet.

2. The combination multimode showerhead and integrated offset water filter system of claim 1 wherein the swivel joint is a swivel ball which allows the integrated showerhead to be raised and kept in position on a shower arm; and the holding element and the hollow water filter cartridge chamber are sized and dimensioned to hold the removable water filter cartridge in place between the holding element and an interior surface of the cap when the cap is mounted in the opening.

3. The combination multimode showerhead and integrated offset water filter system of claim 2 wherein water entering the inlet flows vertically through a filter media bed in the water filter cartridge from a bottom of the filter media bed adjacent the holding element to a top of the filter media bed adjacent the interior surface of the cap to thereby eliminate voids and channels and allow a maximum water to filter media contact to thereby optimize water filtration performance.

4. The combination multimode showerhead and integrated offset water filter system of claim 1 wherein the cap is threadedly mounted in the holding element over the integrated hollow water filter cartridge chamber and has an inner surface that abuts the removable water filter cartridge to aid in holding the removable water filter cartridge in place.

5. The combination multimode showerhead and integrated offset water filter system of claim 4 wherein the holding element held in the integrated hollow water filter cartridge chamber sealingly receives and holds the removable water filter cartridge in place.

6. A combination showerhead and water filter system, comprising;
   a housing having a front portion and a rear portion with a water inlet in the rear portion and a water outlet on a front face of the front portion at a first end;
   an integrated hollow water filter cartridge chamber formed in the housing on the rear portion and fluidly connected with the water inlet;
   a cap removably mounted in an opening formed in the front face of the front portion over the integrated hollow water filter cartridge chamber at a second end;
   a removable water filter cartridge held in the water filter cartridge chamber and being removable from the water filter chamber through the opening in the front face of the front portion when the cap is removed; and
   wherein a multimode selector switch is movably held in a center portion of the front face of the front portion between the water filter cartridge chamber and a plurality of spray nozzles held in the water outlet to direct water exiting from the water filter cartridge chamber passing through the multimode selector switch to selected spray nozzles of said plurality of spray nozzles in the water outlet.

7. The combination showerhead and water filter system of claim 6, further including a holding element held in the integrated hollow water filter cartridge chamber for sealingly receiving and holding the removable water filter cartridge.

8. The combination showerhead and water filter system of claim 7, wherein the hollow water filter cartridge chamber and holding element are sized and dimensioned to hold the removable water filter cartridge in place between the water inlet and an interior surface of the cap when the cap is mounted in the opening.

9. The combination showerhead and water filter system of claim 8 wherein water entering the inlet flows into the hollow water filter cartridge chamber through the filter cartridge from a bottom to a top of filter media held in the filter cartridge.

10. The combination showerhead and water filter system of claim 8 wherein the cap is threadedly mounted in the holding element over the integrated hollow water filter cartridge chamber whereby the inner surface abuts the removable water filter cartridge to aid in holding the removable water filter cartridge in place.

* * * * *